Dec. 8, 1925. 1,564,936
W. C. CADWELL
LOADING MECHANISM FOR CONVEYERS AND THE LIKE
Filed July 26, 1922 3 Sheets-Sheet 2
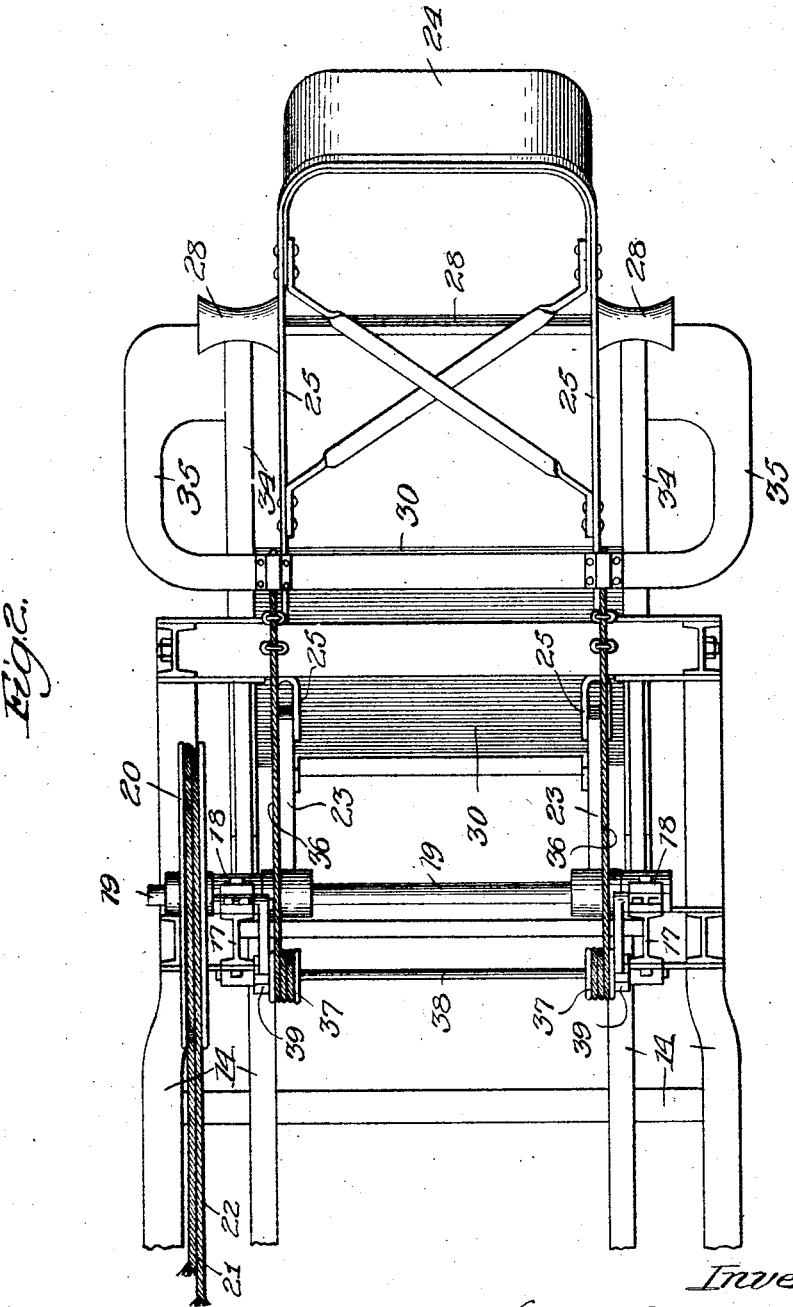

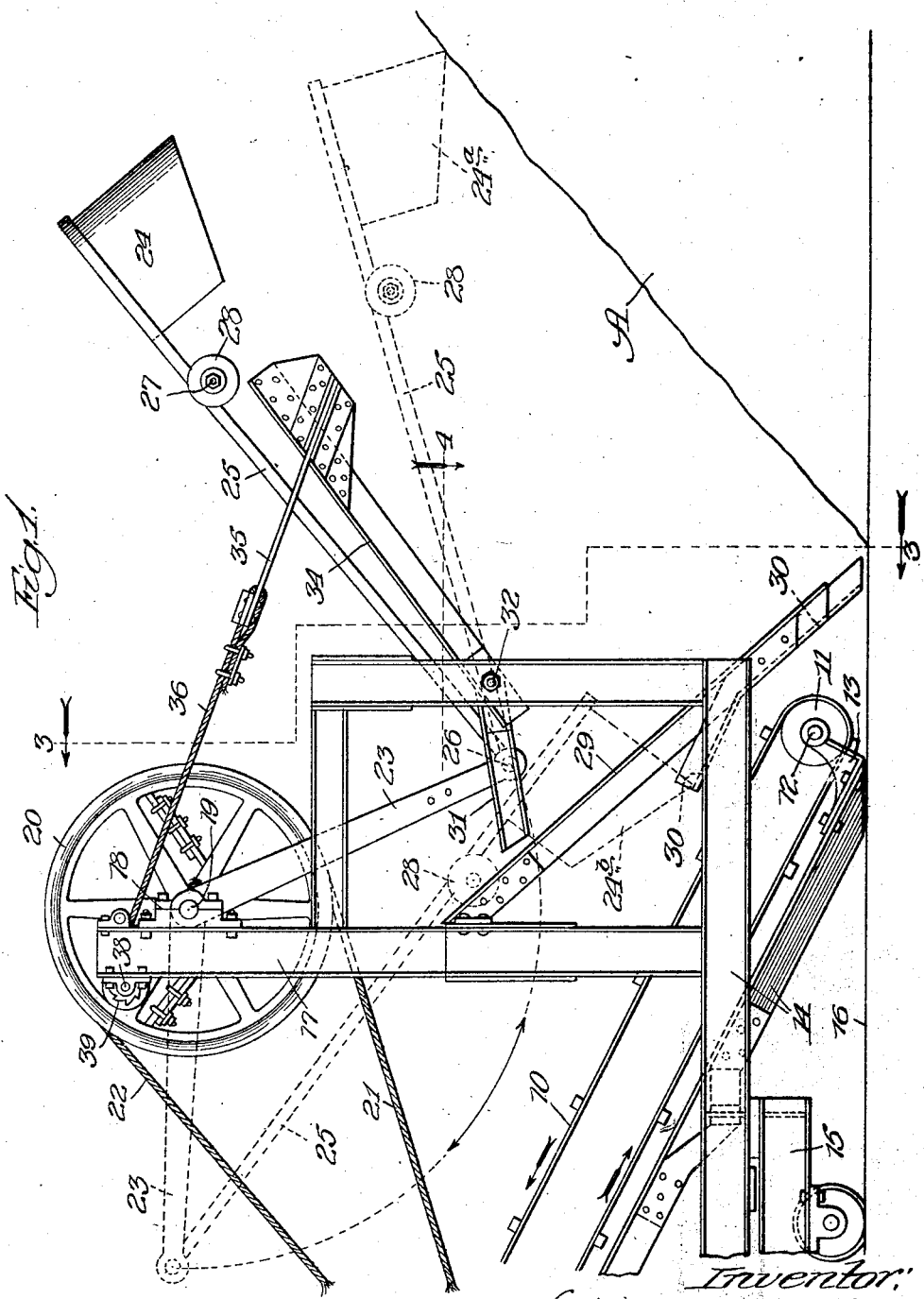

Dec. 8, 1925.
W. C. CADWELL
1,564,936
LOADING MECHANISM FOR CONVEYERS AND THE LIKE
Filed July 26, 1922 3 Sheets-Sheet 3
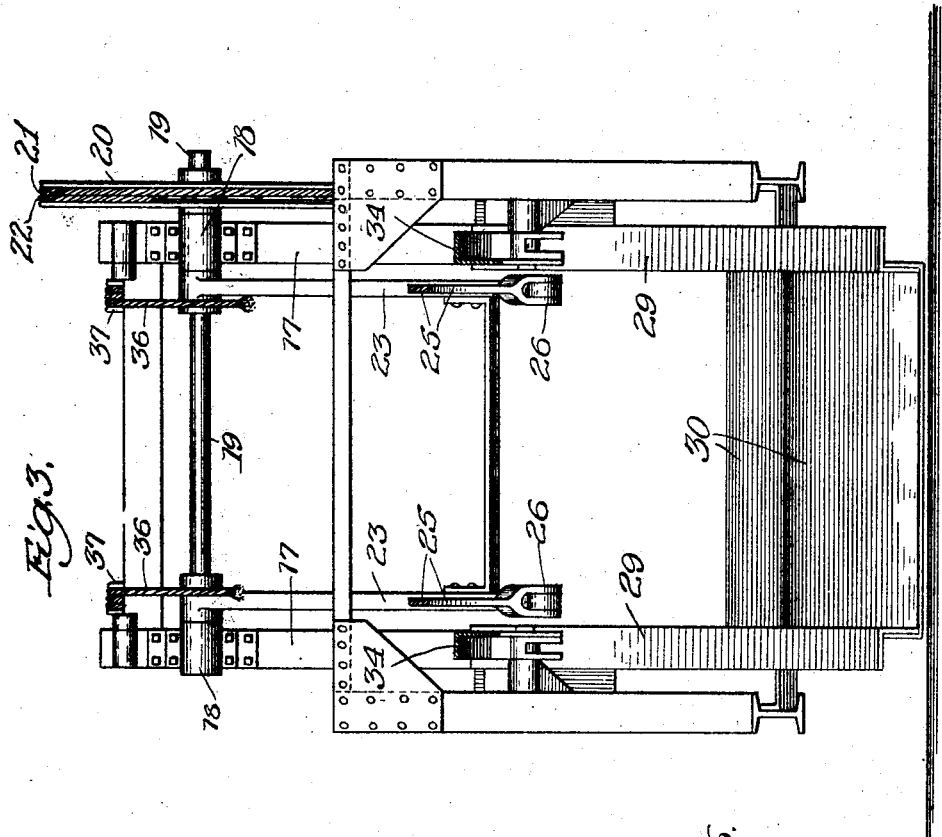
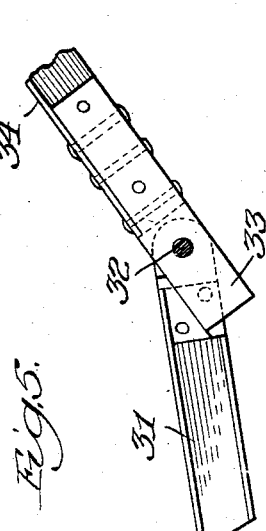
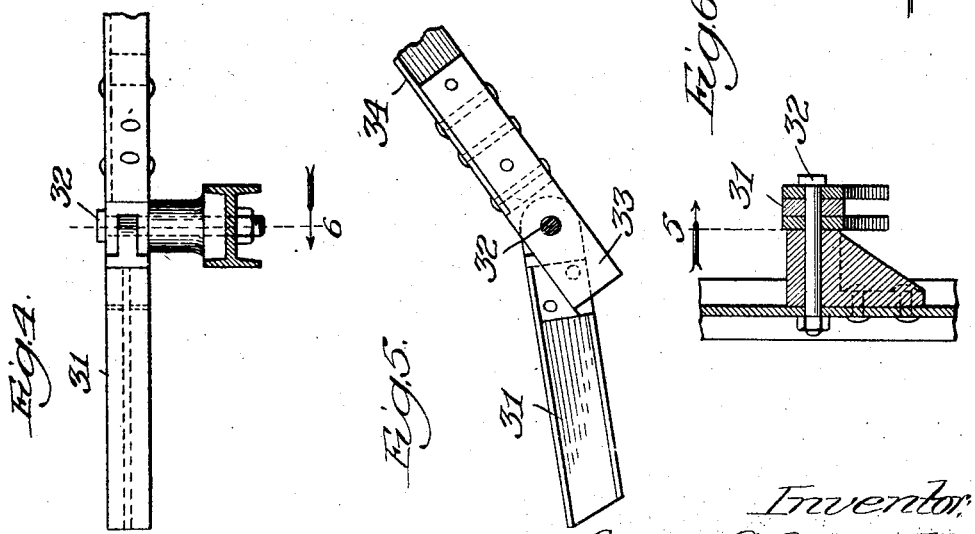
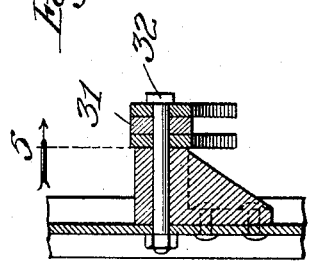

Patented Dec. 8, 1925.

1,564,936

UNITED STATES PATENT OFFICE.

WILFRED C. CADWELL, OF ANACONDA, MONTANA.

LOADING MECHANISM FOR CONVEYERS AND THE LIKE.

Application filed July 26, 1922. Serial No. 577,552.

*To all whom it may concern:*

Be it known that I, WILFRED C. CADWELL, a citizen of the United States, residing at Anaconda, in the county of Deerlodge and State of Montana, have invented a new and useful Improvement in Loading Mechanism for Conveyers and the like, of which the following is a specification.

This invention relates to loading mechanism for conveyers and the like, and is fully described in the following specification and shown in the accompanying drawings, in which:

Figure 1 is a side elevation of the loading mechanism as applied to the tail end of a conveyer;

Fig. 2 is a top plan view of the same;

Fig. 3 is a section on the broken line 3—3 of Fig. 1;

Fig. 4 is an enlarged partial plan view of the switch;

Fig. 5 is a view on the line 5 of Fig. 6; and

Fig. 6 is a section on the line 6 of Fig. 4.

The mechanism as illustrated is shown as applied to the tail end of any suitable form of conveyer such as the belt conveyer here illustrated. This conveyer consists of an endless belt 10 which passes around the pulley 11 on the tail shaft 12 which is journaled in suitable bearings 13 which in turn are mounted upon a frame 14. This frame is mounted upon a truck 15 so that the end of the conveyer may be moved back and forth across the tracks 16 upon which the truck runs. It will be understood, of course, that this conveyer is illustrative only, as the invention resides in the loading mechanism which will now be described and which may be applied to any suitable form of conveyer.

The frame 14 carries uprights 17 to which are secured suitable bearings 18. A shaft 19 is journaled therein and has a sheave 20 keyed thereto. This sheave is provided with parallel grooves in which are secured steel ropes 21 and 22. The opposite ends of these ropes are secured to an operating mechanism (not shown) which is capable of causing the sheave 20 to oscillate through a predetermined arc, to thereby oscillate the rocker arms 23 which are keyed to the shaft 19.

A scraper 24 has U-shaped arms 25 the ends of which are hingedly connected to the outer ends of the rocker arms 23 by means of pins 26. Each arm 25 has a stub axle 27 secured thereto near its outer end upon which is journaled a flanged roller 28.

Parallel tracks 29 are carried by the main frame 14 and are adapted to receive the rollers 28 as the scraper is drawn back by the rocker arms 23. An inclined plate 30 overlies the lower end of the conveyer and is secured to the tracks 29.

It will be understood from the foregoing that with the scraper in the position 24$^a$, Fig. 1, the scraper will be moved to the position 24$^b$ as the rocker arms 23 are moved from the full line position to the dotted line position, and that, at the same time, the scraper resting by its own weight upon the pile of loose material A, some of this material will be caught by the scraper and drawn up the inclined plate 30 and thus fed upon the conveyer 10. As the scraper is drawn up, the roller 28 will ride up the inclined track 29 thereby guiding the scraper in its passage over the plate 30.

As the roller 28 nears the upper end of its movement it will pass under the switch 31 which is hingedly mounted upon the pin 32. This switch is shown in detail in Figs. 4, 5 and 6, and consists preferably of an I-section which is mounted between flat parallel bars 33 to each of which is riveted a track 34, of L-section.

Each track 34 is hingedly mounted upon the pins 32, the outer end being supported by means of the C-shaped support 35 which is suspended upon ropes 36. The opposite end of these ropes pass over drums 37 which are keyed on the shaft 38, the latter being journaled in suitable bearings which are carried by the uprights 17. The shaft 38 is turned by any suitable means, as a crank (not shown), and the track 34 held in adjusted position by means of a ratchet 39 on the shaft 38.

The operation of the loading mechanism is as follows: As the rocker arm 23 is moved from the dotted line position to the full line position, as shown in Fig. 1, the roller 28 at each side rides up the switch 31 and the track 34 and in its outermost position overruns the end of the track and drops off, thereby permitting the scraper 24 to swing about the pin 26 when it falls upon the pile of material A as shown in dotted lines at 24$^a$. The sheave 20 and the rocker arm 23 are then oscillated in a clockwise direction drawing the scraper down through the pile of loose material A and up to the dotted line position 24ᵇ as has been previously described, thereby scraping some of the loose material upon the conveyer 10.

As the roller 28 passes beneath the switch 31, the switch raises about the pin 32 to permit it to pass, and after it has passed drops back to the position shown in Fig. 1.

When the end of the swing of the rocker arm 23 is reached, as shown in dotted lines, it starts back toward the full line position in a counter-clockwise direction, thereby causing the roller 28 to roll up over the switch 31 and out over the end of the track 34, when the scraper 24 will again be dropped upon the pile of loose material A.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A loading mechanism for conveyers comprising a plate adapted to overlie a portion of the conveyer, a shaft adjacent the conveyer, a rocker arm secured to said shaft, a scraper hingedly connected to said rocker arm, a track at the side of said scraper inclined inwardly and upwardly, and a roller on the outer end of said scraper, said roller following said track to cause the scraper to be raised at the outer end of its stroke.

2. A loading mechanism for conveyers comprising a plate adapted to overlie a portion of the conveyer, a shaft adjacent the conveyer, a rocker arm secured to said shaft, a scraper hingedly connected to said rocker arm, a track at the side of said scraper, inclined forwardly and upwardly, a second track extending backwardly and upwardly, a hinged switch connecting said tracks, and a roller on said scraper, said roller following said tracks to cause the scraper to be raised at the outer end of its stroke.

3. A loading mechanism for conveyers comprising a plate adapted to overlie a portion of the conveyer, a shaft adjacent the conveyer, two spaced parallel rocker arms secured to said shaft, a scraper pivotally secured to the outer ends of said rocker arms, two parallel tracks at the sides of said conveyer inclined forwardly and upwardly, a second pair of tracks inclined rearwardly and upwardly, hinged switches connecting said tracks, a roller at each side of said scraper adapted to roll on said tracks, and means for oscillating said rocker arms.

WILFRED C. CADWELL.